Patented Aug. 17, 1954

2,686,790

UNITED STATES PATENT OFFICE 2,686,790

TRITYLATED HYDROXYETIOCHOLANIC ACIDS

Maximilian R. Ehrenstein, Philadelphia, Pa., assignor to The Trustees of the University of Pennsylvania, Philadelphia, Pa., a corporation of Pennsylvania No Drawing. Application May 6, 1953, Serial No. 353,437

3 Claims. (Cl. 260—397.1)

This invention relates to new etiocholane derivatives and more particularly refers to ethers of 3($\beta$),5,19-trihydroxyetiocholanic acids, such as the 19-trityl ether derivatives.

It is an object of this invention to produce new ethers of etiocholanic acid derivatives. It is a further object to produce new trityl ethers of etiocholanic acid derivatives which are of particular value in the synthesis of compounds having physiological activity similar, for example, to progesterone and that of the adrenal cortical hormones. A still further object is to produce new trityl ethers of etiocholanic acid derivatives which may be simply and economically converted into compounds similar to desoxycorticosterone. Additional objects will become apparent from a consideration of the following description and claims.

I have found, as a feature of this invention, that the partial tritylation of trihydroxyetiocholanates opens the way, for the first time in steroid chemistry, for selective oxidation at carbom atom 3. New etiocholanic acid derivatives are thus formed having the general formula:

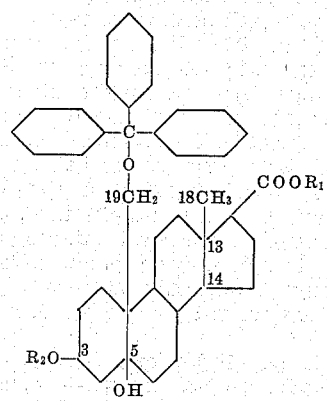

wherein $R_1$ is an esterifying radical such as an alkyl radical, advantageously a lower alkyl radical; and $R_2$ is hydrogen or an acyl radical, advantageously derived from a low molecular weight fatty acid.

The new compounds of this invention are prepared by tritylation of a 3($\beta$),5,19-trihydroxyetiocholanate thereby converting this compound into the corresponding 19-tritoxy-3($\beta$),5-dihydroxyetiocholanate. During this reaction, a small percentage of 3($\beta$),19-ditritoxy-5-hydroxyetiocholanate is also formed. In an acid medium, both of these trityl ethers are easily hydrolyzed to the starting material. Acylation of 19-tritoxy-3($\beta$),5-dihydroxyetiocholanate yields the corresponding 3($\beta$) - acyloxy - 19 - tritoxy - 5 - hydroxyetiocholanate. This latter product, upon alkaline solvolysis, can be reconverted to 19-tritoxy - 3($\beta$),5 - dihydroxyetiocholanate, whereas acid hydrolysis yields 3($\beta$)-acyloxy-5,19-dihydroxyetiocholante. The product formed by acid hydrolysis may be oxidized with chromic acid to 3($\beta$) - acyloxy - 5 - hydroxy - 21 - norpregnane-19,20-dioic acid 20-alkyl ester, and, if desired, further hydrolyzed to convert the 17-carboxylate group to the free acid, and if desired to also convert the 3-acyloxy group to the hydroxy group. The 19 - tritoxy - 3($\beta$),5 - dihydroxyetiocholanate can also be oxidized, in a non-acid medium, to the corresponding 3-keto compound with, for example, N-bromacetamide, N-bromosuccinimide, N-chlorosuccinimide, or with chromic acid. Subsequent cleavage of the tritoxy group yields 3-keto-5,19-dihydroxyetiocholanate, which product, if desired, can be hydrolyzed to form the free acid derivative.

The tritylation of ethyl 3($\beta$),5,19-trihydroxyetiocholanate is representative of the method used in preparing the new compounds of this invention, since this compound contains a primary alcohol group at carbon atom 19, a secondary alcohol group at carbon atom 3, and a tertiary alcohol group at carbon atom 5.

On treating ethyl 3($\beta$),3,19-trihydroxyetiocholanate with one mole of triphenylchloromethane, a reaction product comprising a major proportion of ethyl 19-tritoxy-3($\beta$),5-dihydroxyetiocholanate and a minor proportion of ethyl 3($\beta$),19-ditritoxy-5-hydroxyetiocholanate is obtained. In addition, some unchanged starting materials are recovered. These four components of the reaction mixture can be quantitatively separated by chromatography without difficulty. Since part of the triol starting material is recovered unchanged, and the ditrityl ether is easily hydrolyzed to the triol starting material, none of the steroid starting material is lost, and it can be reacted again with the triphenylchloromethane until substantially all of the triol is converted into the 19-tritoxy derivative.

When ethyl 19-tritoxy-3($\beta$),5-dihydroxyetiocholanate is acetylated in the usual fashion, the resinous 3($\beta$)-acetoxy-19-tritoxy-5-hydroxyetiocholanate is obtained, which, even after purification by chromatography still remains a resinous product. Upon saponification of this resinous material in an alkaline medium, for example, in absolute ethanolic potassium hydroxide, crystalline ethyl 19 - tritoxy - 3($\beta$),5 - dihydroxyetiocholanate is recovered. When, however, the hydrolysis of ethyl 3($\beta$)-acetoxy-19-tritoxy-5-hydroxyetiocholanate is performed in slightly diluted acetic acid, the ether linkage is cleaved yielding ethyl 3($\beta$) - acetoxy - 5,19 - dihydroxyetiocholanate. This monoacetate is then readily oxidized with chromic acid to the 20-ethyl ester of 3($\beta$) - acetoxy - 5 - hydroxy - 21 - norpregnane-19,20-dioic acid. The dicarboxylic acid derivative of the latter compound, that is, the 3($\beta$),5 - dihydroxy - 21 - norpregnane - 19,20-dioic acid, differs from that reported by Butenandt in that the latter possibly possesses the iso configurations at carbon atoms 14 and 17, while the former possesses the normal configuration at the same carbon atoms.

The invention may be more readily understood by consideration of the following illustrative examples wherein all temperatures are expressed in degrees centigrade. It is to be understood, of course, the invention is not limited, but merely illustrated thereby.

Example I.—760.6 mg. (2 millimoles) of ethyl 3($\beta$),5,19-trihydroxyetiocholanate, melting between 180 and 186°, was dissolved in 8 cc. of anhydrous pyridine (distilled over barium oxide) to which was added 557.1 mg. (2 millimoles) of triphenylchloromethane melting at 102–103°. The solution was heated on a steam bath for a period of 85 minutes and then allowed to stand at room temperature (23°) for sixteen hours. It was subsequently poured into a mixture of 250 cc. of ice and water. After standing for one hour, the white gummy precipitate was taken up in 100 cc. of ethyl acetate and the aqueous phase washed with eight portions of 25 cc. of ethyl acetate. The combined ethyl acetate extracts were successively washed with four portions, 25 cc. each of N hydrochloric acid, two portions of 25 cc. of a solution of N sodium bicarbonate and six portions of 3 cc. of water. After drying with sodium sulfate, the ethyl acetate was evaporated, the residue taken up in acetone and this solution again brought to dryness in vacuo. In this fashion 1196 mg. of a brittle foam (theoretical yield: 1244 mg.) was obtained which was dissolved in a mixture of 10 cc. of ether and 10 cc. of petroleum ether. On standing overnight, 59.9 mg. of clusters of crystals separated; M. P. 182–184°. There was no depression of the melting point when mixed with an authentic sample of ethyl 3($\beta$),5,19-trihydroxyetiocholanate. The filtrate was brought to dryness in vacuo and thus yielded 1140 mg. of a white brittle foam. This residue was subjected to chromatographic adsorption for which purpose it was dissolved in a mixture of 140 cc. of benzene and 60 cc. of petroleum ether. The solution was filtered through a column (diameter 22 mm.) of 45 g. of alkali-free aluminum oxide (prepared by placing one part of aluminum oxide in an adsorption column, and then slowly washing with two parts of a 9:1 mixture of methanol-glacial acetic acid, then washed acid free with methanol, and subsequently dried in an oven at a temperature of 200° for a period of four hours). The original solution was passed through within three and one-half hours, the following eluate within one hour, and all other eluates within about thirty minutes each.

CHROMATOGRAPHIC FRACTIONATION

| No. of fraction | Solvent | Weight of residue, mg. | Appearance of residue |
|---|---|---|---|
| 1 | 140 cc. Benzene + 60 cc. petr. ether (original solution). | 88.9 | brittle foam. |
| 2 | 140 cc. benzene + 60 cc. petr. ether. | 143.4 | crystalline. |
| 3 | 160 cc. benzene + 40 cc. petr. ether. | 118.4 | brittle foam. |
| 4 | 170 cc. benzene + 30 cc. petr. ether. | 99.1 | Do. |
| 5 | 180 cc. benzene + 20 cc. petr. ether. | 155.4 | pt. cryst., pt. foam. |
| 6 | 190 cc. benzene + 10 cc. petr. ether. | 127.4 | brittle foam. |
| 7 | 200 cc. benzene | 103.6 | Do. |
| 8 | do | 74.8 | Do. |
| 9 | 190 cc. benzene + 10 cc. ether. | 27.7 | Do. |
| 10 | 175 cc. benzene + 25 cc. ether. | 14.6 | pt. resin, pt. foam. |
| 11 | 150 cc. benzene + 50 cc. ether. | 19.5 | Do. |
| 12 | 100 cc. benzene + 100 cc. ether. | 5.9 | resinous. |
| 13 | 50 cc. benzene + 150 cc. ether. | 5.1 | Do. |
| 14 | 200 cc. ether | 4.0 | Do. |
| 15 | 200 cc. ether + 1 cc. methanol. | 17.2 | pt. resin, pt. cryst. |
| 16 | 195 cc. ether + 5 cc. methanol. | 133.0 | crystalline. |
| 17 | 190 cc. ether + 10 cc. methanol. | 19.8 | Do. |
| 18 | 175 cc. ether + 25 cc. methanol. | 4.5 | pt. resin, pt. cryst. |
| 19 | 150 cc. ether + 50 cc. methanol. | 3.0 | crystalline. |
| 20 | 200 cc. methanol | 29.1 | Do. |
| Total | | 1,194.4 | |

Fractions 5 to 11 gave, by separate treatment with ether, thirteen crops of cubic or rectangular crystals: yield: 416.3 mg.; melting between 177 and 183°. Mixed melting points within this whole series did not show a depression when mixed with an authentic sample of ethyl 19-tritoxy-3($\beta$),5-dihydroxyetiocholanate.

The combined yields of ethyl 19-tritoxy-3($\beta$),5-dihydroxyetiocholanate were recrystallized once more from ether. The first crop represented 391.0 mg. of rectangular crystals; M. P. 179–183°. In addition 56.4 mg. of crystalline material, M. P. 176–179°, was obtained. $[\alpha]_D^{21.5} -16.0°$ (19.6 mg. in 2.0 cc. of chloroform).

In place of the ethyl ester of etiocholanic acid, used above, it will be obvious to those skilled in the art that the 17-carboxyl radical may be esterified by any of the well known esterifying agents, such as those derived from the alkyl, aralkyl or aryl series, but more particularly those from low molecular weight alkyl alcohols. Such other examples of the invention will be apparent from Example I, considering that all that is involved is the selection of the suitable starting material. Likewise, in place of the solvent, anhydrous pyridine, the reaction may be conducted in the presence of any suitable solvent, advantageously an acid binding solvent as triethylamine, and the like.

Example II.—Oxidation of ethyl 19-tritoxy-3($\beta$),5-dihydroxyetiocholanate.—62.2 mg. (0.1 millimoles) of ethyl 19-tritoxy-3($\beta$),5-dihydroxyetiocholanate was dissolved in 2 cc. of glacial acetic acid. Immediately thereafter 5.5 cc. (the equivalent of 1.1 atoms of oxygen) of a solution of 133.4 mg. of chromium trioxide in 100 cc. of 95% acetic acid was added over a period of 75 minutes at room temperature. After standing overnight, 0.4 cc. of absolute ethanol was added and the solution brought to dryness in vacuo. In order to remove the acetic acid completely, the residue was taken up in absolute ethanol and this solution again brought to dryness. To the residue was added 2 cc. of water and 25 cc. of ether. The latter solution was washed with 2 cc. of a solution of N sulfuric acid, three times with small amounts of water, once with 1 cc. of a solution of N sodium carbonate and four times with 1 cc. of water. After drying and evaporating off the ether, 53.4 mg. of a neutral residue was obtained. After the addition of some ice, the carbonate phase and the subsequent aqueous washings were acidified with 0.6 cc. of a solution of 4N sulfuric acid and then extracted four times with 15 cc. of ether. The combined ether extracts were washed with water, dried and evaporated to dryness. Only a trace (4.3 mg.) of acid material was obtained. The neutral phase was purified by chromatography. From the early eluates (benzene-petroleum ether), triphenylcarbinol was isolated. From the later eluates (benzene-ether), several crystalline, but non-identical fractions resulted. One of them had a melting point of 202–210°; it did not show a depression of the melting point when mixed with ethyl 19-oxo-3($\beta$),5-dihydroxyethiocholanate obtained by the partial oxidation of ethyl 3($\beta$),5,19-trihydroxyetiocholanate with chromic acid.

*Example III.—Ethyl 3($\beta$)-acetoxy-19-tritoxy-5-hydroxyetiocholanate.*—To a solution of 62.2 mg. (0.1 millimole) of ethyl 19-tritoxy-3($\beta$),5-dihydroxyetiocholanate in 1 cc. of pyridine was added 1 cc. of acetic anhydride and the mixture allowed to stand at room temperature (27°) for a period of about twenty-two hours. The reaction mixture was brought to dryness in vacuo, the resinous residue dissolved in 75 cc. of ether and subsequently washed twice with 2 cc. of N hydrochloric acid, four times with 1 cc. of a solution of N sodium carbonate and five times with 3 cc. of water. After drying with sodium sulfate and evaporating the ether, 65.0 mg. of a brittle foam was obtained which resisted attempts at crystallization. In order to assure the uniformity of this material, 26.5 milligrams of it were subjected to a chromatographic purification with the aid of 1 gram of alkali-free aluminum oxide prepared as described in Example I (diameter of column: 10 mm.). The major part of the material (24.6 mg.) was recovered from the earliest eluates, varying from 2 cc. benzene +8 cc. petroleum ether to 3.5 cc. benzene +6.5 cc. petroleum ether. The chromatogram demonstrated that the acetylation had resulted in a decrease of polarity. The residues isolated from these early eluates still resisted attempts at crystallization. They were eventually combined, and the optical rotation was determined:

$$[\alpha]_D^{23}+20.2°$$

(19.8 mg. in 2.0 cc. of chloroform).

*Example IV.—Ethyl 3($\beta$)-acetoxy-5,19-dihydroxyetiocholanate.*—To a solution of 65.0 mg. of ethyl 3($\beta$)-acetoxy-19-tritoxy-5-hydroxyetiocholanate in 2.0 cc. of glacial acetic acid was added 5.5 cc. of 95% acetic acid and the mixture allowed to stand at room temperature (29°) for a period of two hours. Thereafter it was brought to dryness in vacuo (50–55°) and the residue taken up in ethanol which was subsequently evaporated. This treatment was repeated several times in order to remove all traces of acetic acid. The residue was eventually taken up in 25 cc. of ether and the resulting solution washed once with 2 cc. of a solution of N sulfuric acid, four times with 1 cc. portions of a solution of N sodium carbonate and four times with 1 cc. portions of water. After drying and evaporating off the ether, 61.0 mg. of a residue was obtained. This material was immediately subjected to a purification by chromatographic adsorption. For this purpose it was dissolved in a mixture of 5 cc. of benzene and 20 cc. of petroleum ether which was filtered through a column (diameter 10 mm.) of 4.0 g. of alkali-free aluminum oxide, prepared as described in Example I, within a period of about one hour. The eluants (25 cc. each) were passed through at the rate of approximately fifteen minutes. A substantial amount of material (21.3 mg.) was obtained from the second and third eluate (ratio: 10 cc. benzene +15 cc. petroleum ether). After recrystallization it was identified as triphenylcarbinol. Only traces of residues were secured from the eluates 4 to 7. Substantial quantities (total: 34.2 mg.) were isolated from the eluates 8 to 14 (ratios: 20 cc. benzene +5 cc. petroleum ether, 25 cc. benzene, 20 cc. benzene +5 cc. ether and 15 cc. benzene +10 cc. ether). These residues were first separately recrystallized from ether. This furnished twenty-five crops of long, thin, rectangular crystals; total yield, 29.2 mg., melting between 150 and 153°. There were no depressions of the melting points within this whole series. All crystalline crops were therefore combined and recrystallized once more from ether; rosettes of short, fine needles were obtained; weight of first crop: 140 mg.; melting point, 149–152°. Additional crystalline crops of identical material were secured from the mother liquor. $[\alpha]_D^{30}+50.7°$ (12.8 mg. in 2.0 cc.).

In another experiment carried out in the same fashion, the cleavage of the trityl ether linkage did not go to completion. In order to be safe, it is recommended, therefore, to perform the cleavage over a period of twenty-four hours rather than two hours as stated above.

*Example V.—3($\beta$)-acetoxy-5-hydroxy-21-norpregnane-19,20-dioic acid-20-ethyl ester.*—To a solution of 35.2 mg. of ethyl 3($\beta$)-acetoxy-5,19-dihydroxyetiocholanate in 2.0 cc. of glacial acetic acid was added at room temperature within a period of twenty minutes, a total of 2.5 cc. (the equivalent of 2.2 atoms of oxygen) of a solution of 136 mg. of chromium trioxide in 25 cc. of 95% glacial acetic acid. The mixture appeared green after the addition of 2.0 cc. of the chromium trioxide solution, but stayed brown after the total of 2.5 cc. had been added. After standing overnight, 0.5 cc. of ethanol was added and the mixture brought to dryness in vacuo. In order to remove the last traces of acetic acid the residue was repeatedly taken up in ethanol and the obtained solution brought to dryness. Finally, 2 cc. of water were added and the resulting precipitate taken up in 25 cc. of ether. The latter extract was washed successively with 2 cc. of a solution of N sulfuric acid, small amounts of water, 1 cc. of a solution of N sodium carbonate and four portions of 1 cc. of water. After drying and evaporating the ether phase, 14.1 mg. of a resinous, neutral residue was obtained. In contra-distinction to the starting material, it did not crystallize from ether. The carbonate phase, including the subsequent aqueous washings, was cooled with ice, acidified by the addition of 1 cc. of a solution of 4 N sulfuric acid and finally extracted with four portions of 15 cc. of ether. The combined ether extracts were washed eight times with 1 cc. portions of water, dried and evaporated in vacuo; weight of the acid residue:

15.2 mg. On adding ether, immediate crystallization of clusters of small rectangles occurred. First crop: weight 2.2 mg.; M. P. 206–212° (decomposition). Second crop: weight 4.3 mg.; M. P. 207.5–209° (decomposition). Third crop: weight 2.2 mg.; M. P. 203–204° (decomposition). These three crystalline fractions were combined and recrystallized once more from ether; rosettes of long, thin needles of 3($\beta$)-acetoxy-5-hydroxy-21-norpregnane-19,20-dioic acid 20-ethyl ester, weighing 6.3 mg. and melting at 206–210° (with decomposition) were obtained.

A reoxidation of the neutral fraction (14.1 mg.) under analogous conditions yielded 8.0 mg. of neutral and 2.8 mg. of acid material. Both residues refused to crystallize.

*Example VI.—3($\beta$),5-dihydroxy - 21 - norpregnane-19,20-dioic acid.*—A portion of the 3($\beta$)-acetoxy-5-hydroxy-21 - norpregnane - 19,20-dioic acid 20-ethyl ester obtained in Example V was added to a 10% solution of alcoholic potassium hydroxide, and refluxed on a steam bath for approximately two hours thereby forming 3($\beta$),5-dihydroxy-21-norpregnane-19,20-dioic acid. It will be observed that this product is of the type of compound A disclosed in my Patent 2,530,816 of November 21, 1950.

By use of the 3($\beta$),5-dihydroxy-21-norpregnane-19,20-dioic acid of Example VI it is possible, by carrying out the reactions described in Patent 2,530,816, to obtain the compound G of that patent. When R' of that compound G is —CH₃ the compound of claim 2 of that patent is obtained and it is identified either as 10-norprogesterone or alternatively, as 19-norprogesterone. The hormonal value of this latter compound is referred to in Abstract 7, High Progestational Activity of 19-Norprogesterone, vol. 12, Journal of Clinical Endocrinology and Metabolism, page 916, July 1952. It is also referred to in Steroids XXII, The Synthesis of 19-Norprogesterone, vol. 73, JACS, page 3540, July 1951.

It is to be understood that the foregoing examples are representative merely of a few of the many embodiments to which this invention is susceptible. Thus, a wide variety of steroid starting materials may be used, it being necessary only that there be a primary and/or secondary hydroxyl group or groups attached to the steroid nucleus, advantageously in the 19- and/or 3-positions.

The oxidation of the 19-tritoxy-3($\beta$),5-dihydroxyetiocholanates need not always be carried out by means of chromium trioxide, as other oxidizing agents capable of transforming a hydroxy group into a keto group can also be used, such as bichromates, bromacetamide in butanol or pyridine, alkali and alkaline earth permanganates, metal oxides and the like.

The acylation of the 19-trityl compound can also be carried out with other well known acylating compounds, and particularly those of low molecular weight fatty acids, and examples of them will be understood from Example III. Other acylating agents may be any suitable derivative of an aliphatic or aromatic carboxylic acid such as acetyl chloride, benzoic acid anhydride, benzoyl halide, phenylacetyl halide, in the presence of pyridine or other acid binding medium, such as in the presence of triethylamine and the like.

Of course, the amounts of the various agents and the type and amount of solvents used in carrying out this invention, the temperatures employed and other reaction conditions may be varied within the limits obvious to those skilled in the art. Hence, many other changes and variations may be made in accordance with the principles set forth herein.

By means of the present invention, a new and important group of cholane derivatives suitable as intermediates in the preparation of steroids having the activity, for example, of the adrenal cortical hormones are, for the first time, prepared. In addition, these new compounds are useful in the field of organic synthesis, since, by the selective tritylation of the primary alcohol group, numerous steroid derivatives modified in the remainder of the steroid nucleus can be obtained. For example, substances which are derived from progesterone, 11-desoxy-corticosterone and 17-hydroxy-11-desoxycorticosterone, in that the angular carbon atom 19 between rings A and B is either missing (19-nor compounds) or is present in an oxygenated form, for example, as a primary alcohol, aldehyde or carboxyl group, can be prepared.

It will be understood, with reference to the various compounds illustrated and described in this specification and its claims, that I do not intend that the invention of any of the compounds described or claimed shall be limited to any particular stereo-chemical configuration about any carbon atom and, in particular, about carbon atoms 3, 5, 10, 14 and 17.

As many widely different embodiments of this invention can be made without departing from the scope thereof, it is to be understood that the invention is not limited to the specific embodiments thereof, except as defined in the appended claims.

This application is a continuation-in-part of my co-pending application Serial No. 164,633, filed May 26, 1950, now abandoned, entitled Tritylated Hydroxyetiocholanic Acids.

What I claim is:

1. Etiocholanic acids having the general formula:

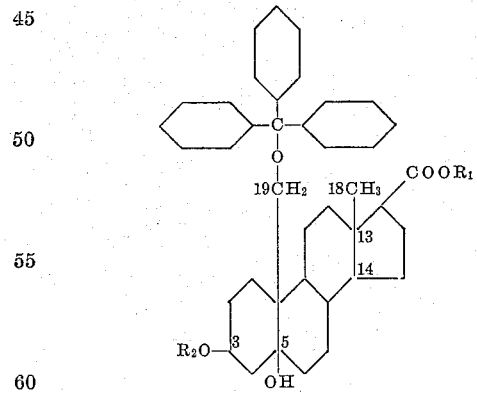

wherein R₁ is an esterfying radical derived from a low molecular weight alcohol and R₂ is selected from the class consisting of hydrogen and an acyl radical derived from a low molecular weight fatty acid.

2. The ethyl ester of 19-tritoxy-3($\beta$),5-dihydroxy-etiocholanic acid.

3. The ethyl ester of 3($\beta$)-acetoxy-19-tritoxy-5-hydroxy-etiocholanic acid.

No references cited.